US012361696B2

(12) United States Patent
Tolstikhin et al.

(10) Patent No.: US 12,361,696 B2
(45) Date of Patent: Jul. 15, 2025

(54) MULTI-LAYER PERCEPTRON-BASED COMPUTER VISION NEURAL NETWORKS

(71) Applicant: Google LLC, Mountain View, CA (US)

(72) Inventors: Ilya Tolstikhin, Adliswil (CH); Neil Matthew Tinmouth Houlsby, Zurich (CH); Alexander Kolesnikov, Zurich (CH); Lucas Klaus Beyer, Zurich (CH); Alexey Dosovitskiy, Berlin (DE); Mario Lucic, Adliswil (CH); Xiaohua Zhai, Zurich (CH); Thomas Unterthiner, Berlin (DE); Daniel M. Keysers, Stallikon (CH); Jakob D. Uszkoreit, Berlin (DE); Yin Ching Jessica Yung, Vienna (AT); Andreas Peter Steiner, Zurich (CH)

(73) Assignee: Google LLC, Mountain View, CA (US)

( * ) Notice: Subject to any disclaimer, the term of this patent is extended or adjusted under 35 U.S.C. 154(b) by 589 days.

(21) Appl. No.: 17/737,507

(22) Filed: May 5, 2022

(65) Prior Publication Data

US 2022/0375211 A1 Nov. 24, 2022

Related U.S. Application Data

(60) Provisional application No. 63/185,312, filed on May 6, 2021.

(51) Int. Cl.
G06V 10/82 (2022.01)
G06N 3/04 (2023.01)
G06V 10/764 (2022.01)

(52) U.S. Cl.
CPC .............. *G06V 10/82* (2022.01); *G06N 3/04* (2013.01); *G06V 10/764* (2022.01)

(58) Field of Classification Search
None
See application file for complete search history.

(56) References Cited

U.S. PATENT DOCUMENTS

2021/0064938 A1* 3/2021 Ahuja ................. G06V 10/764
2022/0012848 A1* 1/2022 Ranftl ................. G06T 3/4046

OTHER PUBLICATIONS

Ba et al., "Layer normalization," arXiv, Jul. 21, 2016, 14 pages.
(Continued)

Primary Examiner — Andrew H Lam
(74) Attorney, Agent, or Firm — Fish & Richardson P.C.

(57) ABSTRACT

Methods, systems, and apparatus, including computer programs encoded on computer storage media, for processing images using mixer neural networks. One of the methods includes obtaining one or more images comprising a plurality of pixels; determining, for each image of the one or more images, a plurality of image patches of the image, wherein each image patch comprises a different subset of the pixels of the image; processing, for each image of the one or more images, the corresponding plurality of image patches to generate an input sequence comprising a respective input element at each of a plurality of input positions, wherein a plurality of the input elements correspond to respective different image patches; and processing the input sequences using a neural network to generate a network output that characterizes the one or more images, wherein the neural network comprises one or more mixer neural network layers.

17 Claims, 4 Drawing Sheets

(56) References Cited

OTHER PUBLICATIONS

Bello et al., "Revisiting ResNets: Improved Training and Scaling Strategies," Advances in Neural Information Processing Systems, 2021, 14 pages.
Bello, "LambdaNetworks: Modeling Long-Range Interactions Without Attention," arXiv, Feb. 17, 2021, 31 pages.
Beyer et al., "Are we done with ImageNet?" arXiv, Jun. 12, 2020, 15 pages.
Bhojanapalli et al., "Understanding Robustness of Transformers for Image Classification," Proceedings of the IEEE/CVF International Conference on Computer Vision (ICCV), Oct. 2021, pp. 10231-10241.
Brock et al., "High-Performance Large-Scale Image Recognition Without Normalization," Proceedings of the 38th International Conference on Machine Learning, 2021, 13 pages.
Child et al., "Generating long sequences with sparse transformers," arXiv, Apr. 23, 2019, 10 pages.
Chollet, "Xception: Deep Learning With Depthwise Separable Convolutions," Proceedings of the IEEE Conference on Computer Vision and Pattern Recognition (CVPR), Jul. 2017, pp. 1251-1258.
Cordonnier et al., "On the relationship between self-attention and convolutional layers," arXiv, Jan. 10, 2020, 18 pages.
Cubuk et al., "AutoAugment: Learning Augmentation Strategies From Data," Proceedings of the IEEE/CVF Conference on Computer Vision and Pattern Recognition (CVPR), Jun. 2019, pp. 113-123.
Cubuk et al., "Randaugment: Practical Automated Data Augmentation With a Reduced Search Space," Proceedings of the IEEE/CVF Conference on Computer Vision and Pattern Recognition (CVPR) Workshops, Jun. 2020, pp. 702-703.
Deng et al., "ImageNet: A large-scale hierarchical image database," Presented at 2009 IEEE Conference on Computer Vision and Pattern Recognition, Miami, FL, USA, Jun. 20-25, 2009, pp. 248-255.
distill.pub [online], "Computing receptive fields of convolutional neural networks," Nov. 4, 2019, retrieved on Aug. 5, 2022, retrieved from URL<https://distill.pub/2019/computing-receptive-fields/?ref=https://githubhelp.com>, 19 pages.
Dosovitskiy et al., "An Image is Worth 16×16 Words: Transformers for Image Recognition at Scale," arXiv, Jun. 3, 2021, 22 pages.
github.com [online], "Pytorch image models," 2019, retrieved on Aug. 5, 2022, retrieved from URL<https://github.com/rwightman/pytorch-image-models>, 18 pages.
He et al., "Deep Residual Learning for Image Recognition," Proceedings of the IEEE Conference on Computer Vision and Pattern Recognition (CVPR), Jun. 2016, pp. 770-778.
Hendrycks et al., "Gaussian error linear units (GELUs)," arXiv, Jun. 27, 2016, 6 pages.
Howard et al., "MobileNets: Efficient Convolutional Neural Networks for Mobile Vision Applications," arXiv, Apr. 17, 2017, 9 pages.
Hu et al., "Squeeze-and-excitation networks," Proceedings of the IEEE Conference on Computer Vision and Pattern Recognition (CVPR), Jun. 2018, pp. 7132-7141.
Huang et al., "Deep networks with stochastic depth," European Conference on Computer Vision, Sep. 17, 2016, 16 pages.
Ioffe et al., "Batch Normalization: Accelerating Deep Network Training by Reducing Internal Covariate Shift," Proceedings of the 32nd International Conference on Machine Learning, 2015, 9 pages.
Jia et al., "Scaling up visual and vision-language representation learning with noisy supervision," Proceedings of the 38th International Conference on Machine Learning, 2021, 13 pages.
Kolesnikov et al., "Big transfer (BiT): General visual representation learning," European Conference on Computer Vision, Oct. 29, 2020, 17 pages.
Krizhevsky et al., "ImageNet Classification with Deep Convolutional Neural Networks," Advances in Neural Information Processing Systems, 2012, 9 pages.
Krizhevsky et al., "Learning multiple layers of features from tiny images," Technical Report, Apr. 8, 2009, 60 pages.
LeCun et al., "Backpropagation Applied to Handwritten Zip Code Recognition," Neural Computation, Dec. 1989, 1:541-551.
Li et al., "Involution: Inverting the Inherence of Convolution for Visual Recognition," Proceedings of the IEEE/CVF Conference on Computer Vision and Pattern Recognition (CVPR), Jun. 2021, pp. 12321-12330.
Luo et al., "Understanding the effective receptive field in deep convolutional neural networks," Advances in Neural Information Processing Systems, 2016, 9 pages.
Mahajan et al., "Exploring the Limits of Weakly Supervised Pretraining," Proceedings of the European Conference on Computer Vision (ECCV), Sep. 2018, pp. 181-196.
Neyshabur, "Towards Learning Convolutions from Scratch," Advances in Neural Information Processing Systems, 2020, 11 pages.
Nilsback et al., "Automated Flower Classification over a Large Number of Classes," Presented at 2008 Sixth Indian Conference on Computer Vision, Graphics & Image Processing, Bhubaneswar, India, Dec. 16-19, 2008, pp. 722-729.
Parkhi et al., "Cats and dogs," Presented at 2012 IEEE Conference on Computer Vision and Pattern Recognition, Providence, RI, USA, Jun. 16-21, 2012, pp. 3498-3505.
Parmar et al., "Image transformer," Proceedings of the 35th International Conference on Machine Learning, 2018, 10 pages.
Pham et al., "Meta pseudo labels," Proceedings of the IEEE/CVF Conference on Computer Vision and Pattern Recognition (CVPR), Jun. 2021, pp. 11557-11568.
Pinz, "Object categorization," Foundations and Trends in Computer Graphics and Vision, 2006, 1(4):255-353.
Polyak et al., "Acceleration of Stochastic Approximation by Averaging," SIAM Journal on Control and Optimization, Jul. 1992, 30(4):838-855.
Ramachandran et al., "Stand-alone self-attention in vision models," Advances in Neural Information Processing Systems, 2019, 13 pages.
Sandler et al., "Non-Discriminative Data or Weak Model? On the Relative Importance of Data and Model Resolution," Proceedings of the IEEE/CVF International Conference on Computer Vision (ICCV), Oct. 2019, 9 pages.
Shang et al., "Understanding and Improving Convolutional Neural Networks via Concatenated Rectified Linear Units," Proceedings of the 33rd International Conference on Machine Learning, 2016, 9 pages.
Sifre, "Rigid-motion scattering for image classification," PhD Thesis, Ecole Polytechnique, CMAP, Oct. 6, 2014, 128 pages.
Simonyan et al., "Very deep convolutional networks for large-scale image recognition," arXiv, Apr. 10, 2015, 14 pages.
Srinivas et al., "Bottleneck Transformers for Visual Recognition," Proceedings of the IEEE/CVF Conference on Computer Vision and Pattern Recognition (CVPR), Jun. 2021, pp. 16519-16529.
Srivastava et al., "Dropout: A simple way to prevent neural networks from overfitting," Journal of Machine Learning Research, Jun. 2014, 30 pages.
Sun et al., "Revisiting Unreasonable Effectiveness of Data in Deep Learning Era," Proceedings of the IEEE International Conference on Computer Vision (ICCV), Oct. 2017, pp. 843-852.
Szegedy et al., "Going deeper with convolutions," Proceedings of the IEEE Conference on Computer Vision and Pattern Recognition (CVPR), Jun. 2015, 9 pages.
Szegedy et al., "Rethinking the inception architecture for computer vision," Proceedings of the IEEE Conference on Computer Vision and Pattern Recognition (CVPR), Jun. 2016, pp. 2818-2826.
Touvron et al., "Fixing the train-test resolution disrepancy," Advances in Neural Information Processing Systems, 2019, 11 pages.
Touvron et al., "Training data-efficient image transformers & distillation through attention," arXiv, Dec. 23, 2020, 22 pages.
Vaswani et al., "Attention is all you need," Advances in Neural Information Processing Systems, 2017, 11 pages.
Vaswani et al., "Scaling local self-attention for parameter efficient visual backbones," Proceedings of the IEEE/CVF Conference on Computer Vision and Pattern Recognition (CVPR), Jun. 2021, pp. 12894-12904.

(56) References Cited

OTHER PUBLICATIONS

Wang et al., "Non-local neural networks," Proceedings of the IEEE Conference on Computer Vision and Pattern Recognition (CVPR), Jun. 2018, pp. 7794-7803.

Wang et al., "Pyramid vision transformer: A versatile backbone for dense prediction without convolutions," Proceedings of the IEEE/CVF International Conference on Computer Vision (ICCV), Oct. 2021, pp. 568-578.

Xie et al., "Aggregated residual transformations for deep neural networks," Proceedings of the IEEE Conference on Computer Vision and Pattern Recognition (CVPR), Jul. 2017, pp. 1492-1500.

Xie et al., "Self-training with noisy student improves imagenet classification," Proceedings of the IEEE/CVF Conference on Computer Vision and Pattern Recognition (CVPR), Jun. 2020, pp. 10687-10698.

Zhai et al., "A large-scale study of representation learning with the visual task adaptation benchmark," arXiv, Oct. 1, 2019, 35 pages.

Zhang et al., "mixup: Beyond empirical risk minimization," arXiv, Apr. 27, 2018, 13 pages.

* cited by examiner

MULTI-LAYER PERCEPTRON-BASED COMPUTER VISION NEURAL NETWORKS

CROSS-REFERENCE TO RELATED APPLICATION

This application claims priority to U.S. Provisional Application No. 63/185,312, filed on May 6, 2021, entitled "Multi-Layer Perceptron-Based Computer Vision Neural Networks" the entirety of which is hereby incorporated by reference.

BACKGROUND

This specification relates to neural networks that process images to perform computer vision tasks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that executes a mixer neural network that has been configured through training to process one or more images to generate a network output that characterizes the one or more images.

The mixer neural network can be configured to process an input sequence representing an image and includes multiple mixer layers. At least some of the tokens of the input sequence can correspond to respective patches of the input image. That is, the system can segment the image into patches and process the pixels of each patch to generate a respective token of the input sequence.

Each mixer layer contains a token mixing multi-layer perceptron to mix features across all of the tokens of the input sequence, and a channel mixing multi-layer perceptron to mix the channels within each token of the input sequence.

By applying the mixer layers to these tokens, the mixer neural network can attend over the entire image, leveraging both local and global information to generate the output sequence.

The subject matter described in this specification can be implemented in particular embodiments so as to realize one or more of the following advantages.

Using techniques described in this specification, a system can process images using a mixer neural network and achieve comparable performance to or even better performance than other state-of-the-art neural networks (e.g. convolutional neural networks and vision transformers). In the mixer layer of the mixer neural network, the channel mixing multi-layer perceptron parameters are tied, preventing the mixer neural network architecture from growing too quickly in terms of memory footprint and computational capacity when increasing the number of input tokens in an input sequence. Thus, the mixer neural network has an accuracy that is comparable to or higher than other common neural networks for image classification, e.g. convolutional neural networks and vision transformers, despite having a significantly simpler architecture. In particular, techniques described in this specification leverage the simpler architecture of the mixer neural networks to permit large scale training, leading to similar or better accuracy in image processing tasks without increased computation time as the dataset size increases. The mixer neural network also demonstrates similar transfer performance (i.e. re-using trained model for new training) and accuracy of image classification (e.g. top-1 and top-5 accuracy metrics) compared to convolutional neural networks and vision transformers. Moreover, the simpler architecture of the mixer neural network allows the neural network to be more readily deployed on custom hardware, e.g., an ASIC for accelerating neural network computations, improving the inference efficiency of the neural network.

As described in this specification, a mixer neural network configured to process images can require far fewer computations to achieve the same performance as a state-of-the-art convolutional neural network. That is, for a fixed compute budget, the mixer neural network performs better than the convolutional neural network. This is because applying a mixer layer is generally more computationally efficient than convolving a kernel across an entire image, as the mixer layer is able to perform simple matrix multiplications when applying multi-layer perceptrons with fewer computations than convolution. As a particular example, a mixer neural network as described in this specification can achieve comparable or superior performance to large-scale convolutional neural networks while requiring 2×, 5×, 10×, 100×, or 1000× fewer computations.

Compared to a state-of-the-art convolutional neural network, a mixer neural network can also require fewer computations to achieve the same performance due to nature of its architecture. For example, the token mixing multi-layer perceptron in the mixer layer uses the same kernel for all of the channels in a token in contrast to separable convolutions, where a different kernel is applied to each channel. By sharing the same kernel, the token mixing multi-layer perceptron prevents the architecture from growing too quickly when increasing the number of hidden dimensions in the perceptron or the size of the input sequence processed. Additionally, each mixer layer in the mixer neural network accepts an input token with fixed width compared to the pyramidal structure of conventional convolutional neural networks. The fixed width of the inputs used in the mixer layer ensures that the layers do not become too deep, and therefore restricts the computation complexity of the neural network. Finally, the mixer layer architecture is invariant to the order of input tokens and the pixels represented in the input tokens, whereas convolutional neural network performance is highly dependent on position i.e. out of order input tokens or local pixel shuffling in the token degrades neural network performance.

Compared to a state-of-the-art vision transformer, a mixer neural network can also require fewer computations to achieve the same performance due to nature of its architecture. For example, the computational complexity based on the number of input patches processed is linear for the mixer neural network, i.e., because the token mixing MLPs are applied independently for each channel of each token, but quadratic for a vision transformer.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF DRAWINGS

Like reference numbers and designations in the various drawings indicate like elements.

DETAILED DESCRIPTION

This specification describes a system implemented as computer programs on one or more computers in one or more locations that is configured to execute a multi-layer perceptron (MLP) mixer based neural network configured to process one or more images, i.e., to process the intensity values of the pixels of the one or more images, to generate a network output that characterizes the one or more images.

Figure 1:
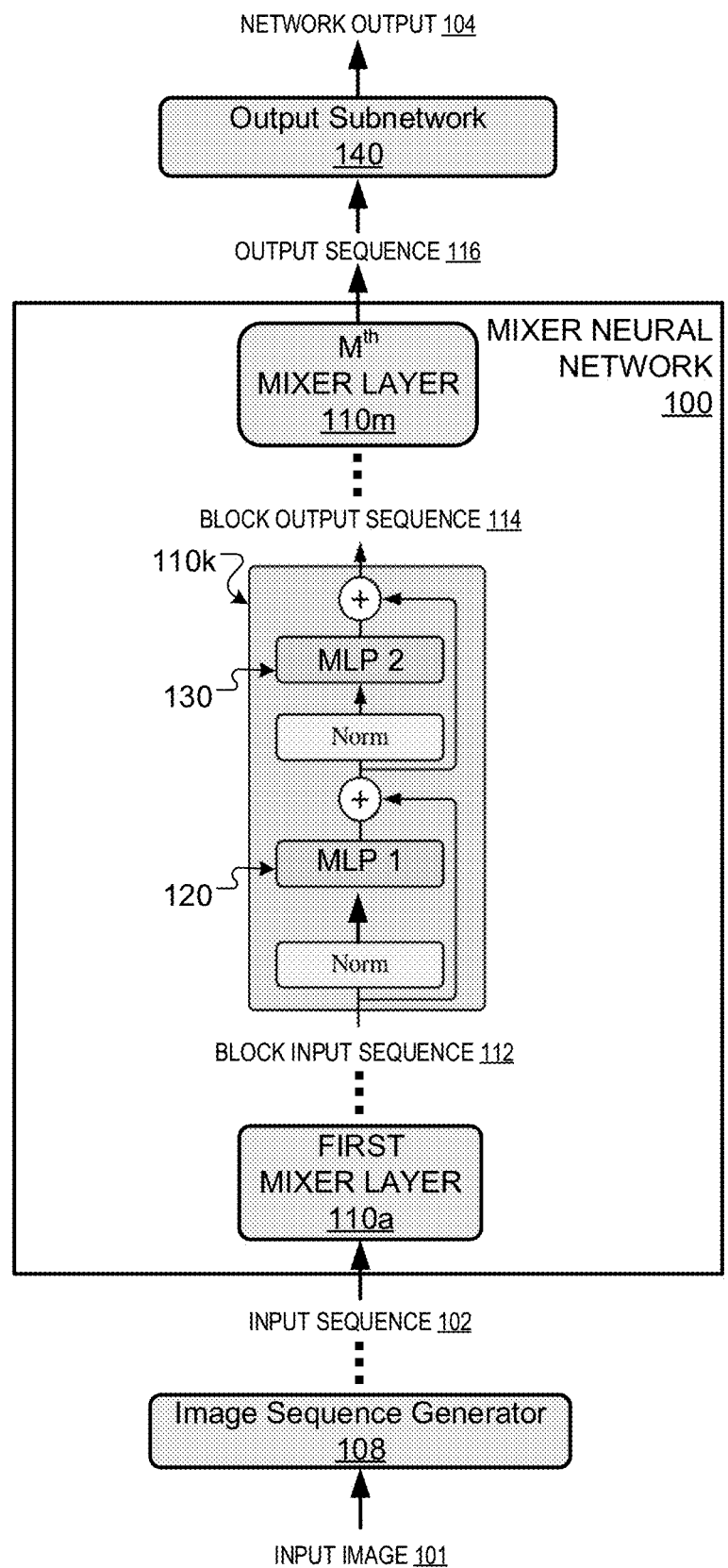
FIG. 1 is a diagram of an example mixer based neural network.

FIG. 1 is a diagram of an example mixer neural network 100. The mixer neural network 100 is an example of a system implemented as computer programs on one or more computers in one or more locations, in which systems, components, and techniques described below can be implemented.

The mixer neural network 100 is configured to process an input sequence 102 that represents an image and that includes a respective input element ("token") at each of multiple input positions. For example, the input sequence 102 can include respective input tokens representing each of multiple patches of an input image 101. The input token representing each patch is generated by applying a transformation to the intensity values of the pixels in the patch.

The mixer neural network 100 is configured to process the input sequence 102 representing the input image 101 and generate a network output 104 that represents a prediction about the image. The mixer neural network 100 can be configured to perform any appropriate machine learning task using the input sequence 102 representing the input image 101. Example machine learning tasks are discussed below.

The input image 101 referenced in this specification can be any appropriate type of image. For example, the input image 101 can be a two-dimensional image, e.g., a two-dimensional image that has multiple channels (e.g., an RGB image). As another example, the input image 101 can be a hyperspectral image that represents a continuous spectrum of wavelengths, e.g., by identifying, for each pixel in the image, a distribution over the spectrum. As another example, the input image 101 can be a point cloud that includes multiple points, where each point has a respective coordinate, e.g., in a three-dimensional or a higher-dimensional coordinate space; as a particular example, the input image 101 can be a point cloud generated by a LIDAR sensor. As another example, the input image 101 can be a medical image generating by a medical imaging device; as particular examples, the input image 101 can be a computer tomography (CT) image, a magnetic resonance imaging (MM) image, an ultrasound image, an X-ray image, a mammogram image, a fluoroscopy image, or a positron-emission tomography (PET) image.

Although the below description refers to generating image patches of an image that each include respective "pixels" of the image, it is to be understood that the mixer neural network 100 can generate image patches that include components of the image that are of any appropriate type. For example, if the input image 101 is a point cloud, then each image patch of the image can include a subset of the points in the point cloud. As another example, if the input image is an MRI image that includes multiple voxels in a three-dimensional voxel grid, then each image patch of the image can include a subset of the voxels in the voxel grid.

The input sequence 102 includes n tokens, at least some of which represent a different image patch from the input image 101.

An image sequence generator 108 processes the input image 101 to transform the image patches into tokens for the input sequence 102.

The image sequence generator 108 is configured to process the input image 101 and to generate n different patches of the input image 101 for input sequence 102. In this specification, an image patch of an image is a strict subset of the pixels of the image. Generally, each image patch includes multiple contiguous pixels of the input image 101. That is, for each particular image patch and for any pair of pixels in the particular image patch, there exists a path from the first pixel of the pair to the second pixel of the pair where the path only includes pixels in the particular image patch.

In some implementations, each pixel in the input image 101 is included in exactly one of the image patches. In some other implementations, one or more image patches can include the same pixel from the input image 101, i.e., two or more of the images patches can overlap. Instead or in addition, one or more pixels from the input image 101 can be excluded from each of the image patches, i.e., one or more pixels are not included in any of the image patches.

The image patches can be represented in any appropriate way. For example, each image patch can be represented as a two-dimensional image that includes the pixels of the image patch, e.g., an image that maintains the spatial relationships of the pixels in the image patch.

As another example, each image patch can be represented as a one-dimensional sequence of the pixels of the image patch. As a particular example, if the image patch is a two-dimensional region of the input image 101, then the image patch can be a flattened version of the two-dimensional region, as is described in more detail below. As another particular example, if the image patch includes only pixels that share the same column or row of the input image 101 (i.e., if the image patch is a one-dimensional region of the input image 101), then the image patch can be represented as a one-dimensional sequence that maintains the relative positions of the pixels.

As another example, each image patch can be represented as an unordered set of the pixels of the image patch.

Example image patches are described in more detail below with reference to FIG. 3.

The image sequence generator 108 is configured to obtain the image patches of the input image 101, and to generate a respective token for each of the image patches. Each token represents the pixels of the corresponding image patch and can be generated by processing the pixels of the corresponding image patch. In this specification, each token has a respective value for each of the multiple channels e.g., the tokens are d dimensional vectors where each of the d dimensions is a different channel. Each vector can contain floating point or other types of numerical values.

For example, the image sequence generator 108 can process the input image 101 by dividing the input image 101 into non-overlapping image patches and then projecting, e.g., linearly projecting, each of the image patches using the same projection technique to generate the token representing the image patch.

As a particular example, if each image patch has dimensionality L×W×C, where C represents the number of channels of the input image 101 (e.g., C=3 for an RGB image), then the image sequence generator 108 can flatten each image patch into a one dimensional tensor having dimensionality 1×(L·W·C).

The image sequence generator 108 processes the image patches into tokens for the input sequence 102 using a linear projection:

$$z_i = x_i E_i + b_i$$

where $z_i \in \mathbb{R}^D$ is the $i^{th}$ token, D is the input dimensionality required by the mixer neural network 100, i.e., the number of channels in each of the tokens, $x_i \in \mathbb{R}^N$ is the one-dimensional tensor including the $i^{th}$ image patch, N is the number of pixels in the $i^{th}$ image patch, $E_i \in R^{N \times D}$ is a projection matrix, and $b_i \in \mathbb{R}^D$ is a linear bias term.

In some implementations, a different respective projection matrix $E_i$ is used to generate each token in the input sequence 102; in some other implementations, the same projection matrix E is used to generate each token. Similarly, in some implementations, a different bias $b_i$ is used to generate each token; in some other implementations, the same bias term $b_i$ is used to generate each token.

In some implementations, the linear projection is machine-learned. For example, during training of the mixer neural network 100, a training system can concurrently update the parameters of the linear projection (e.g., the parameters of the projection matrices $E_i$ and bias terms $b_i$). As a particular example, the training system can update the parameters of the linear projection by backpropagating a training error of the neural network 100 through the neural network 100 and to the token, and determining the update using stochastic gradient descent on the backpropagated error.

In some implementations, one or more of the input tokens in the input sequence 102 do not correspond to an image patch of the input image 101. For example, the input sequence 102 can include a class token that is the same for all received images. For example, the class token can be a tensor having the same dimensionality as the tokens corresponding to image patches. As a particular example, the class token can be a tensor of all '0's or all '1's.

The class token can be inserted at any position in the input sequence 102; e.g., the class token can be the first input token of the input sequence 102, or the last input token of the input sequence 102.

In some implementations, the class token is machine-learned. For example, during the training of the mixer neural network 100, a training system can concurrently learn the values in the class token by backpropagating a training error of the mixer neural network 100 through the mixer neural network 100 and to the class token.

In some other implementations, each token in the input sequence 102 corresponds to one of the patches of the image 101 and the input sequence 102 does not include a class token.

The mixer neural network 100 includes a sequence of M mixer layers 110a-m, M≥1. Each mixer layer 110a-m is configured to receive a block input sequence 112 that includes a respective block input token for each input position in the input sequence 102; that is, each block input token corresponds to a respective input token of the input sequence 102. Each mixer layer 110a-m is configured to process the block input sequence and to generate a block output sequence that includes a respective block output token for each of the multiple input positions in the input sequence. That is, each block input sequence 112 preserves the number of tokens in the input sequence 102 as the mixer neural network 100 processes the sequence. In other words, for each mixer layer 110a-m, the block input sequence 112 or block output sequence 114 is generated with the same length as the input sequence 102, i.e. having the same number of output tokens as there are input tokens in the inputs sequence 102.

The first mixer layer 110a in the sequence can receive the input sequence 102. Each subsequent mixer layer 110a-m in the sequence can receive, as the block input sequence 112, the respective block output sequence generated by the preceding mixer layer 110a-m in the sequence. The block output sequence of the $M^{th}$ and final mixer layer 110m can be the output sequence 116.

Each mixer layer 110a-m includes one or more mixer neural network layers. Referring to the $k^{th}$ mixer layer 110k, the mixer layer 110k includes a first multi-layer perceptron (MLP) 120 and a second multi-layer perceptron (MLP) 130.

The first MLP 120 and the second MLP 130 each are examples of feed-forward neural networks with multiple feed-forward layers.

Each MLP is a feed-forward neural network that includes multiple fully-connected layers. Each fully-connected layer applies an affine transformation to the input to the layer, e.g., multiplies an input vector to the layer by a weight matrix of the layer. Optionally, one or more of the fully-connected layers can apply a non-linear activation function to the output of the affine transformation to generate the output of the layer. Some examples of non-linear activation functions include ReLU, logistic, hyperbolic tangent, etc.

In some implementations, one or more of the mixer layers 110a-m include a residual connection layer that combines the outputs of the mixer neural network layer with the inputs to the next mixer neural network layer.

Instead or in addition, one or more mixer layers 110a-m can include a layer normalization layer that applies layer normalization to the input and/or the output of the mixer neural network layer. These layers are referred to as "Norm" operations in FIG. 1.

In some implementations, the first MLP 120 is configured to obtain the respective block input tokens in the block input sequence 112 while, in some other implementations, the mixer layer first applies one or more operations, e.g., layer norm, and the first MLP 120 processes the output of those operations.

In some implementations, the second MLP 130 is configured to obtain the output of the first MLP 120, while, in some other implementations, the mixer layer first applies one or more operations, e.g., layer norm, to the output of the first MLP 120 and the second MLP 120 processes the output of those operations.

For example, the mixer layer 110k can first apply a layer normalization layer to the block input sequence 112 before providing the output of the layer normalization layer to the first MLP 120.

Generally, for each given channel of each given token, the first MLP 120 is configured to transform the value of the given token for the given channel based on the values for the given channel of the other tokens (and the value for the given channel within the given token). Thus, for each channel, the first MLP 120 "mixes" the values of the tokens for the channel. The first MLP 120 can be applied independently for each of the d channels of each of the tokens, i.e., so that the first MLP 120 mixes each channel independently of each other channel.

Generally, for each token, the second MLP 130 is configured to transform the value for the channels within the token based on only the values within the given token. Thus, for each token, the second MLP 130 "mixes" the values channels within the token. The second MLP 130 can be applied independently for each of the tokens in the input to the second MLP 130, i.e., so that the second MLP 130 mixes each token independently of each other token.

The first and second MLPs 120 and 130 will be described in more detail below with reference to FIG. 2.

In some implementations, one or more of the mixer layers 110*a-m* include a residual connection layer that combines the outputs of the first MLP 120 and the second MLP 130.

After generating the output sequence 116, the mixer neural network 100 can process one or more of the tokens from the output sequence 116 to generate a network output 104 for the machine learning task.

The mixer neural network 100 can process one or more of the tokens from the output sequence using an output subnetwork 140. The output subnetwork 140 can have any appropriate architecture that allows the subnetwork 140 to map a token to the network output 104 for the machine learning task. For example, when the task is a classification task, the output subnetwork 140 can include one or more fully-connected layers, e.g., linear layers, optionally followed by a softmax layer. When the output is a regression task, the output subnetwork 140 can include one or more fully-connected layer followed by a different type of output layer appropriate for the regression task, e.g., a linear layer, a sigmoid output layer, and so on.

In implementations where the input sequence 102 includes the class token, the output subnetwork 140 process a token from the output sequence 160 that corresponds to the class token to generate the network output 104 for the machine learning task.

In some other implementations, when then input sequence 102 does not include the class token, the output subnetwork 140 receives the output sequence 116 and applies a pooling operation, e.g., global average pooling, over the output tokens. The output subnetwork 140 generates a pooled token by applying the pooling operation and then processes the pooled token to generate the network output 104 for the machine learning task.

The mixer neural network 100 can be configured to perform any appropriate machine learning task with respect to the input image 101, e.g., a classification task, a regression task, or a combination thereof.

As a particular example, the mixer neural network 100 can be configured to generate a classification output that includes a respective score corresponding to each of multiple categories. The score for a category indicates a likelihood that the image belongs to the category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or the winter), and the image may belong to the category if it has the global property corresponding to the category.

As another particular example, the mixer neural network 100 can be configured to generate a pixel-level classification output that includes, for each pixel in the image, a respective score corresponding to each of multiple categories. For a given pixel, the score for a category indicates a likelihood that pixel belongs to the category. In some cases, the categories may be classes of objects, and a pixel may belong to a category if it is part on an object included in the object class corresponding to the category. That is, the pixel-level classification output may be semantic segmentation output.

As another particular example, the mixer neural network 100 can be configured to generate a regression output that estimates one or more continuous variables (i.e., that can assume infinitely many possible numerical values) that characterize the image. In a particular example, the regression output may estimate the coordinates of bounding boxes that enclose respective objects depicted in the image. The coordinates of a bounding box may be defined by (x, y) coordinates of the vertices of the bounding box. For example, the system may output the (x, y) coordinates of two of the coordinates of the bounding box or can output the coordinates of the center of the bounding box and the height and width of the bounding box.

In some implementations, the mixer neural network 100 can be configured to perform a video analysis task. For example, the mixer neural network 100 can receive multiple input images 101 that are video frames of a video, and can process each video frame as described above to generate an output that characterizes the video frames, e.g., by characterizing whether the video frames depict a person performing a particular action.

In some such implementations, the mixer neural network 100 processes each video frame at respective different time points to generate a respective network output 104 for each video frame that characterizes a prediction for the video frame. For example, the mixer neural network 100 can generate a network output 104 that predicts a classification of the video frame. In some such implementations, the mixer neural network 100 combines the multiple network outputs 104 corresponding to respective video frames to generate a final network output that characterizes the video. For example, the mixer neural network 100 can process the respective network outputs 104 using a downstream neural network, e.g., a recurrent neural network.

In some other implementations, the mixer neural network 100 processes each video frame concurrently to generate a single network output 104 that characterizes the video. That is, the mixer neural network 100 can be configured to process multiple input images 101 concurrently. For example, the image sequence generator 108 can generate a respective input sequence 102 for the mixer neural network 100, corresponding to each image 102 as described above. The mixer neural network 100 can then combine the multiple input sequences into a single combined input sequence, e.g., by concatenating the input sequences, and then process the combined input sequence using the mixer neural network 100.

Prior to using the mixer neural network 100 to perform the task, a training system trains the neural network to perform the task, i.e., to determine trained values of the parameters of the mixer neural network 100, the output subnetwork 140, and the input sequence generator 108. For example, the training system can train the mixer neural network 100 from scratch on training data for the task to minimize a loss function for the task, e.g., a cross-entropy loss, a negative log likelihood loss, and so on using conventional machine learning techniques. As another example, the training system can first pre-train the mixer neural network 100 on an unsupervised objective and then fine-tune the mixer neural network 100 on the training data for the task. As yet another example, the training system can train the mixer neural network 100 on both unlabeled data and the training data for the task through semi-supervised learning.

Figure 2:
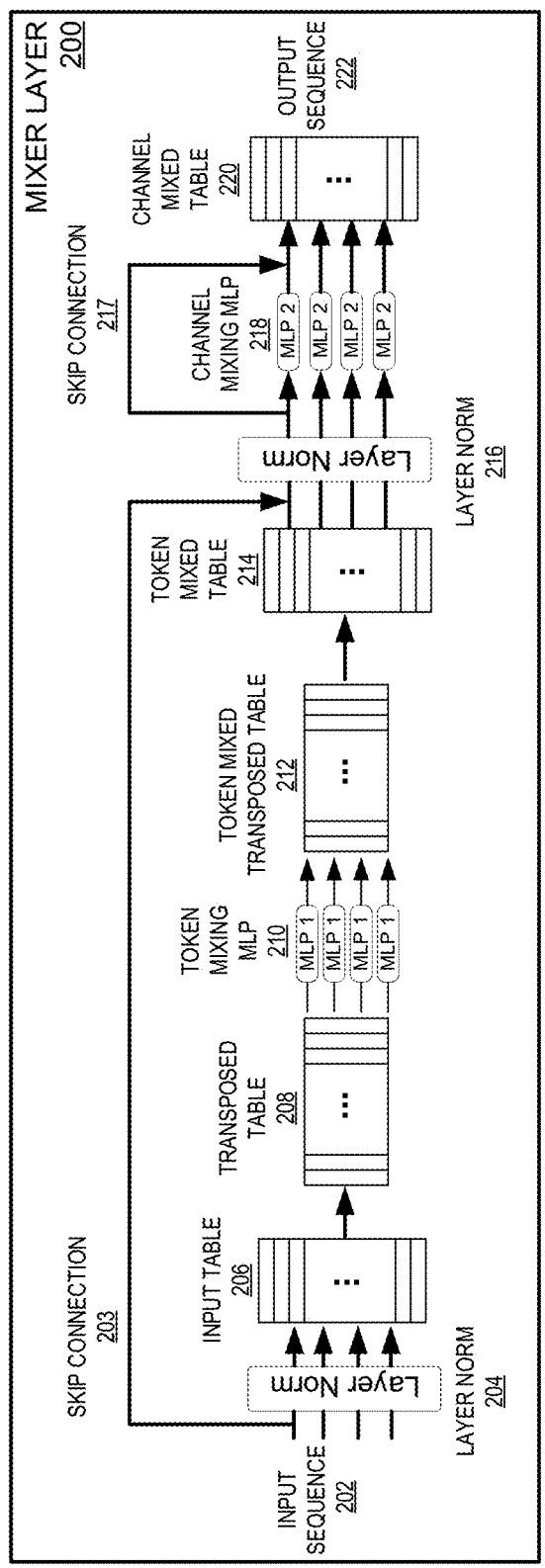
FIG. 2 is a diagram of an example mixer layer in the mixer based neural network.

FIG. 2 is a diagram of a mixer layer 200. The mixer layer 200 is an example of one of the mixer layers in the mixer neural network 100 of FIG. 1.

The mixer layer 200 is configured to receive a layer input sequence 202 that includes a plurality of input tokens and to process the layer input sequence to generate a layer output sequence 222 that includes a respective output token for each of the input tokens. The layer output sequence can then be provided as input to the next mixer layer or, if the mixer layer 200 is the last mixer layer in the mixer neural network 100, to another component of the mixer neural network 100, e.g., an output subnetwork of the mixer neural network 100.

Generally, the mixer layer 200 includes a token mixing MLP 210 and a channel mixing MLP 218, referring to the first MLP 120 and the second MLP 130 (respectively) of FIG. 1.

In some implementations, the mixer layer 200 processes the tokens of input sequence 202 using a layer norm operation 204 prior to processing the tokens of the input sequence 202 with the token mixing MLP 210.

In the example of FIG. 2, the input sequence 202 is represented as an input table 206, where rows correspond to tokens and columns correspond to channels.

In the example of FIG. 2, the mixer layer 200 is configured to transpose the input table 206 into a transposed table 208 that has rows corresponding to channels and columns corresponding to tokens. The mixer layer 200 can then apply the token-mixing MLP 210 independently to each of the rows of the transposed table 208, i.e., to each channel of the tokens of the input sequence 202.

In the example of FIG. 2, the token mixing MLP 210 is configured to mix across the columns of the transposed table 208, representing mixing across the channels of all of the tokens in the input sequence 202. The token mixing MLP 210 applies the same MLP, i.e., with the same, tied parameter values, to each column of the transposed table, i.e. applies, for each channel, the first MLP 120 to all of the values of the tokens for that channel.

After operating on each of the channels of the tokens, the token mixing MLP 210 produces a token mixed transposed table 212.

In the example of FIG. 2, the mixer layer 200 transposes the token mixed transposed table 212 into a token mixed table 214, with rows corresponding to tokens and columns corresponding to channels.

Optionally, the mixer layer 200 applies a skip connection 203 to the input sequence 202 and the token mixed table 214 and adds the input sequence 202 to the token mixed table 214.

In some implementations, the mixer layer 200 processes the token mixed table 214 using a layer norm operation 216 prior to applying the channel mixing MLP 218 to the table 214.

The mixer layer 200 is configured to apply the channel mixing MLP 218 to the token mixed table 214.

The channel mixing MLP 210 is applied independently on each of the rows of the token mixed table 214, i.e., to each token of the tokens of input sequence 202.

In the example of FIG. 2, the channel mixing MLP 218 is configured to mix across the rows of the token mixed table 214, representing mixing across each of the channels within each token in the token mixed table 413. Thus, the same channel mixing MLP 218 is applied to each token independently.

After operating on each of the tokens, the channel mixing MLP 218 produces a channel mixed table 220.

The mixer layer 200 processes the channel mixed table 220 into an output sequence 222, representing an example of a block input sequence 112 for the next mixer layer 200 of the mixer neural network 100 (referring to FIG. 1). For example, the mixer layer 200 can apply a skip connection 217 between the table 220 and the output of the preceding layer norm operation to generate the output sequence 222.

Figure 3:
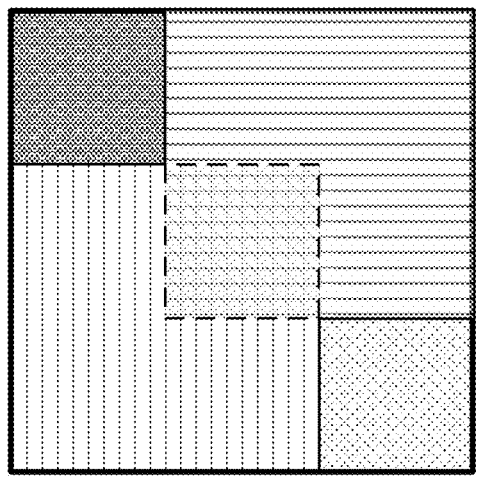
FIG. 3 illustrates example images segmented into image patches.
Figure 3:
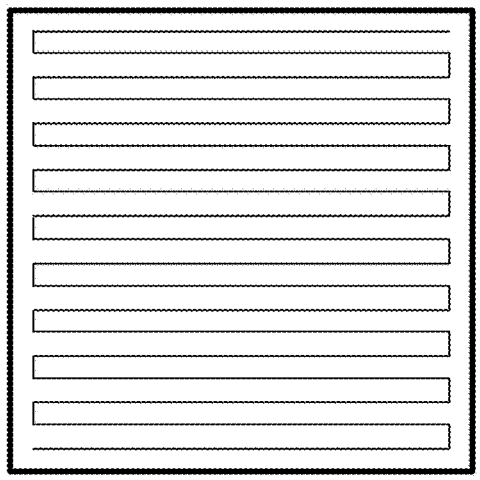
Figure 3:
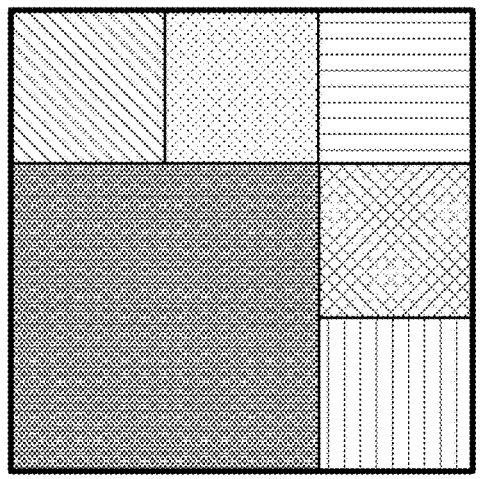
Figure 3:
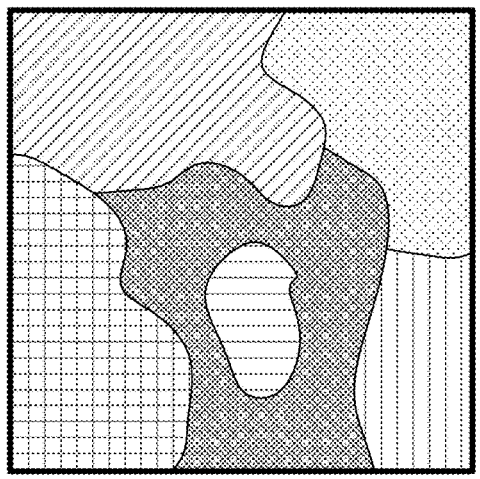
Figure 3:
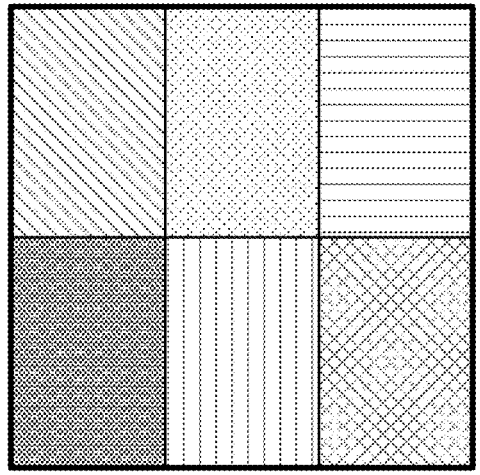
Figure 3:
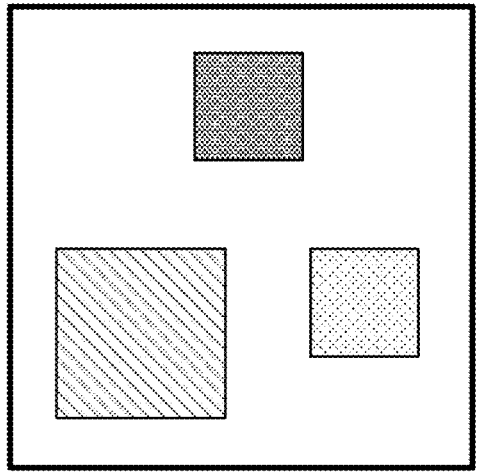

FIG. 3 illustrates example images 310, 320, 330, 340, 350, and 360 segmented into image patches.

The images 310-360 can be provided as input to a neural network, e.g., the mixer neural network 100 described above with reference to FIG. 1, that is configured to process the images 310-360 to generate a prediction about the images 310-360. The neural network can include an image patch generation system, e.g., the image patch generation system 110 described above with reference to FIG. 1, that segments the images 310-360 into multiple image patches. The image patches, or a network input generated from the image patches, can then be processed by a self-attention based neural network to generate the prediction about the images.

The images 310, 320, 330, 340, 350, and 360 depict different possibilities for segmenting images into image patches. In particular, in FIG. 3, each image 310 is depicted as segmented into a set of multiple image patches that are each visually distinct, i.e., using different shading or hatching. Generally, an image generation system would be configured to segment all received images according to the same schema. That is, the same image generation system would not necessarily segment each of the images 310, 320, 330, 340, 350, and 360 as depicted, because the images have been segmented according to different schema.

As depicted in the first image 310, in some implementations, the image patch generation system can generate image patches that each have the same size and shape, e.g., each image patch can be a rectangle. Furthermore, in some implementations, the image patch generation system can segment the first image 310 such that every pixel is a member of exactly one image patch. As a particular example, as depicted in FIG. 3, the image patches can represent a grid of same-sized rectangles. As another particular example, the image patches can represent a grid of same-sized hexagons.

As depicted in the second image 320, in some implementations, the image patch generation system can generate image patches that have different sizes.

As depicted in the second image 330, in some implementations, the image patch generation system can segment the third image 330 such that some pixels are members of multiple different image patches.

As depicted in the fourth image 340, in some implementations, the image patch generation system can segment the fourth image 340 such that some pixels are not members of any image patch. For example, the image generation system can process the fourth image 340 using a machine learning model to identify one or more regions of interest, and the image patch generation system can generate a respective patch for each identified region of interest. For example, the machine learning model can be configured to identify one or more pixels, and the image patch generation system can generate a respective patch centered at each identified pixel.

As depicted in the fifth image 350, in some implementations, the image patch generation system can generate image patches of arbitrary shape. That is, the image patches are not required to be rectangular. For example, the image generation system can process the fifth image 350 using a machine learning model that is configured to segment the fifth image 350, e.g., by assigning each pixel in the fifth image 350 a respective class. The image patch generation system can then generate a respective patch for each contiguous set of pixels that have been assigned the same class by the machine learning model.

As depicted in the sixth image 360, in some implementations, the image patch generation system can generate a one-dimensional space-filling curve that includes each pixel of the image. The image patch generation system can then segment the one-dimensional space-filling curve to generate a set of one-dimensional image patches. As a particular example, the image patch generation system can segment each column or row of the image into n sub-sequences of the pixels of the column or row, such that each sub-sequence represents an image patch.

Although the images 310-360 are depicted in FIG. 3 as two-dimensional images (or images that are two-dimensional with multiple channels, e.g., RGB images), generally the neural network can be configured to generate predictions for any type of image, as described above with reference to FIG. 1.

Figure 4:
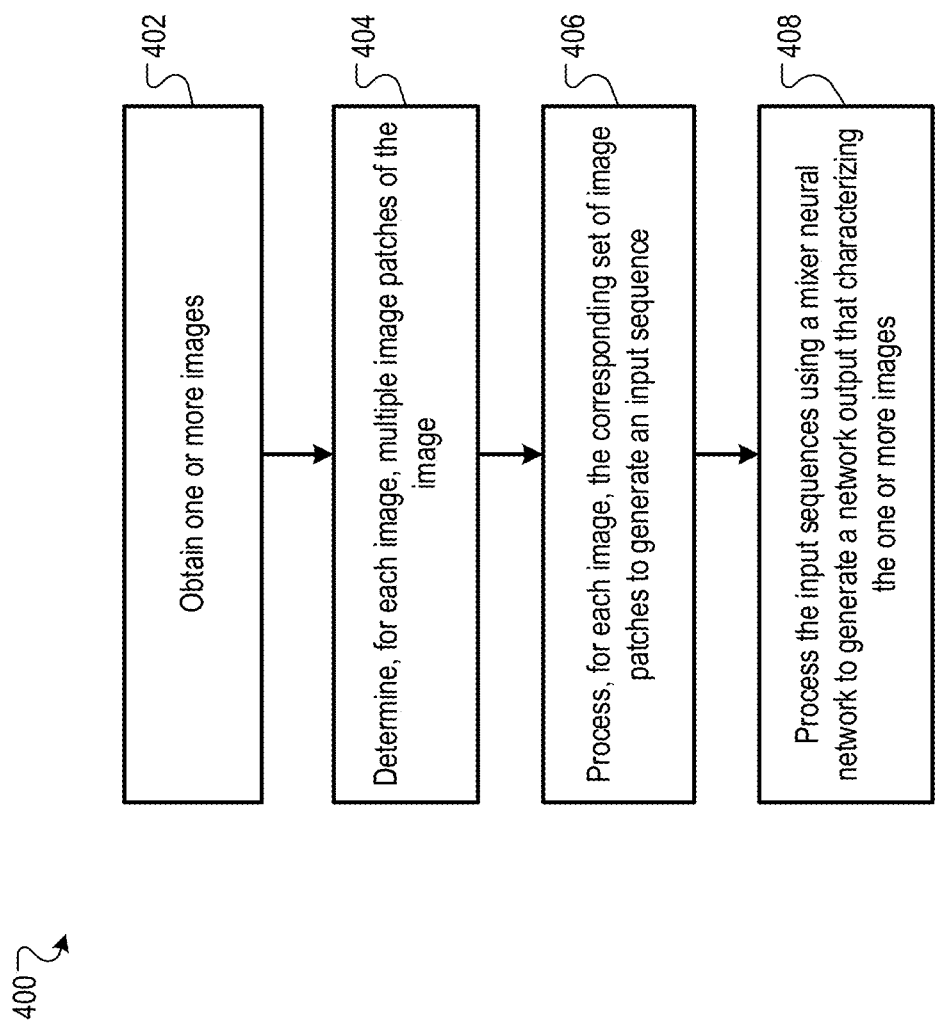
FIG. 4 is a flow diagram of an example process for generating a prediction about one or more images using a mixer based neural network.

FIG. 4 is a flow diagram of an example process 400 for generating a prediction about one or more images using a mixer neural network. For convenience, the process 400 will be described as being performed by a system of one or more computers located in one or more locations. For example, a neural network, e.g., the mixer neural network 100 depicted in FIG. 1, appropriately programmed in accordance with this specification, can perform the process 400.

The mixer neural network can include one or more mixer layers. For example, the mixer neural network can be the mixer neural network 100 described above with reference to FIG. 1.

The system obtains one or more images (step 402).

The system determines, for each image of the one or more images, a set of multiple image patches of the image (step 404). Each image patch includes a different subset of the pixels of the image.

The system processes, for each image of the one or more images, the corresponding set of image patches to generate an input sequence (step 406). The input sequence can include a respective token at each of multiple input positions, where one or more of the input tokens correspond to respective patches of the image.

In some implementations, for each image patch, the system can generate a respective one-dimensional initial input token that includes the pixels of the image patch. For instance, the initial input token can be a flattened version of the image patch. The system can then generate the input token corresponding to the image patch using the initial input token.

In some implementations, the input sequence corresponding to a particular image includes one or more input tokens in addition to the input tokens corresponding to the image patches of the image.

The system processes the input sequence using the mixer neural network to generate a network output that characterizes the one or more images (step 408).

For example, the system can process the input sequence using a mixer layer (e.g., the mixer layer 200 described above with reference to FIG. 2) to generate a respective output token for each input token of the input sequence. For example, the mixer layer can use a token mixing multi-layer perceptron and a channel mixing multi-layer perceptron as described above.

The system can then process the one or more output tokens using one or more additional mixer layers followed by an output subnetwork to generate the network output about the input image or images.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

What is claimed is:

1. A method performed by one or more computers, the method comprising:
   obtaining an image comprising a plurality of pixels;
   determining a plurality of image patches of the image, wherein each image patch comprises a different subset of the pixels of the image;
   processing the plurality of image patches to generate an input sequence comprising a respective input token at each of a plurality of input positions, wherein each input token comprises a respective value for each of a plurality of channels; and
   processing the input sequence using a neural network to generate a network output that characterizes the one or more images, wherein the neural network comprises one or more mixer layers, and wherein each mixer layer includes:
   a token-mixing multi-layer perceptron (MLP) that is configured to:
      receive a first input sequence comprising a respective token at each of the plurality of input positions; and
      generate an intermediate sequence comprising a respective intermediate token at each of the input positions, comprising, for each channel, processing the values for the channel in each of the tokens using the token-mixing MLP; and a channel-mixing multi-layer perceptron (MLP) that is configured to:
receive a second intermediate sequence generated from the intermediate sequence and comprising a respective token at each of the plurality of input positions; and
generate an updated sequence comprising a respective updated token at each of the input positions, comprising, for each token, processing the values for the channels within the token using the channel-mixing MLP, wherein the channel-mixing MLP uses a same set of parameters for processing the values for the channels within each of the tokens at each of the input positions.

2. The method of claim 1, wherein each mixer layer is configured to generate the second intermediate sequence from the intermediate sequence by applying a skip connection, layer norm, or both to the intermediate sequence.

3. The method of claim 1, wherein each mixer layer is configured to generate an output layer sequence for the mixer layer by applying a skip connection, layer norm, or both to the updated sequence.

4. The method of claim 1, wherein processing the plurality of image patches corresponding to an image to generate an input sequence comprises, for each image patch:
generating a respective one-dimensional initial input element that includes the pixels of the image patch; and
generating a respective input token using the respective initial input element.

5. The method of claim 4, wherein each image patch has dimensionality L×W×C, wherein C represents a number of channels of the image, and wherein each initial input element has dimensionality 1×(L·W·C).

6. The method of claim 1, wherein each mixer layer is configured to:
generate the first input sequence from a layer input sequence to the mixer layer.

7. The method of claim 1, wherein:
the network output comprises a classification output that includes a respective score corresponding to each of multiple categories, a score for a category indicating a likelihood that the image belongs to the category;
the network output comprises a pixel-level classification output that includes, for each pixel in the image, a respective score corresponding to each of multiple categories, wherein the score for a category indicates a likelihood that the pixel belong to the category;
the network output comprises coordinates for one or more bounding boxes that enclose respective objects depicted in the image; or
the neural network receives multiple images that are video frames of a video, and the network output comprises an output that characterizes the video frames.

8. A system comprising one or more computers and one or more storage devices storing instructions that when executed by the one or more computers cause the one or more computers to perform operations comprising:
obtaining an image comprising a plurality of pixels;
determining a plurality of image patches of the image, wherein each image patch comprises a different subset of the pixels of the image;
processing the plurality of image patches to generate an input sequence comprising a respective input token at each of a plurality of input positions, wherein each input token comprises a respective value for each of a plurality of channels; and
processing the input sequence using a neural network to generate a network output that characterizes the one or more images, wherein the neural network comprises one or more mixer layers, and wherein each mixer layer includes:
a token-mixing multi-layer perceptron (MLP) that is configured to:
receive a first input sequence comprising a respective token at each of the plurality of input positions; and
generate an intermediate sequence comprising a respective intermediate token at each of the input positions, comprising, for each channel, processing the values for the channel in each of the tokens using the token-mixing MLP; and
a channel-mixing multi-layer perceptron (MLP) that is configured to:
receive a second intermediate sequence generated from the intermediate sequence and comprising a respective token at each of the plurality of input positions; and
generate an updated sequence comprising a respective updated token at each of the input positions, comprising, for each token, processing the values for the channels within the token using the channel-mixing MLP, wherein the channel-mixing MLP uses a same set of parameters for processing the values for the channels within each of the tokens at each of the input positions.

9. The system of claim 8, wherein each mixer layer is configured to generate the second intermediate sequence from the intermediate sequence by applying a skip connection, layer norm, or both to the intermediate sequence.

10. The system of claim 8, wherein each mixer layer is configured to generate an output layer sequence for the mixer layer by applying a skip connection, layer norm, or both to the updated sequence.

11. The system of claim 8, wherein processing the plurality of image patches corresponding to an image to generate an input sequence comprises, for each image patch:
generating a respective one-dimensional initial input element that includes the pixels of the image patch; and
generating a respective input token using the respective initial input element.

12. The system of claim 11, wherein each image patch has dimensionality L×W×C, wherein C represents a number of channels of the image, and wherein each initial input element has dimensionality 1×(L·W·C).

13. The system of claim 8, wherein each mixer layer is configured to:
generate the first input sequence from a layer input sequence to the mixer layer.

14. The system of claim 8, wherein:
the network output comprises a classification output that includes a respective score corresponding to each of multiple categories, a score for a category indicating a likelihood that the image belongs to the category;
the network output comprises a pixel-level classification output that includes, for each pixel in the image, a respective score corresponding to each of multiple categories, wherein the score for a category indicates a likelihood that the pixel belong to the category;
the network output comprises coordinates for one or more bounding boxes that enclose respective objects depicted in the image; or the neural network receives multiple images that are video frames of a video, and the network output comprises an output that characterizes the video frames.

15. One or more non-transitory computer-readable storage media storing instructions that when executed by one or more computers cause the one or more computers to perform operations comprising:

obtaining an image comprising a plurality of pixels;

determining a plurality of image patches of the image, wherein each image patch comprises a different subset of the pixels of the image;

processing the plurality of image patches to generate an input sequence comprising a respective input token at each of a plurality of input positions, wherein each input token comprises a respective value for each of a plurality of channels; and processing the input sequence using a neural network to generate a network output that characterizes the one or more images, wherein the neural network comprises one or more mixer layers, and wherein each mixer layer includes:

a token-mixing multi-layer perceptron (MLP) that is configured to:

receive a first input sequence comprising a respective token at each of the plurality of input positions; and generate an intermediate sequence comprising a respective intermediate token at each of the input positions, comprising, for each channel, processing the values for the channel in each of the tokens using the token-mixing MLP; and a channel-mixing multi-layer perceptron (MLP) that is configured to:

receive a second intermediate sequence generated from the intermediate sequence and comprising a respective token at each of the plurality of input positions; and generate an updated sequence comprising a respective updated token at each of the input positions, comprising, for each token, processing the values for the channels within the token using the channel-mixing MLP, wherein the channel-mixing MLP uses a same set of parameters for processing the values for the channels within each of the tokens at each of the input positions.

16. The non-transitory computer-readable storage media of claim 15, wherein each mixer layer is configured to generate the second intermediate sequence from the intermediate sequence by applying a skip connection, layer norm, or both to the intermediate sequence.

17. The non-transitory computer-readable storage media of claim 15, wherein each mixer layer is configured to generate an output layer sequence for the mixer layer by applying a skip connection, layer norm, or both to the updated sequence.

* * * * *